United States Patent
Spryshak et al.

(10) Patent No.: US 6,405,743 B1
(45) Date of Patent: Jun. 18, 2002

(54) DAMPENING OF SOLENOID OPERATED VALVE

(75) Inventors: Joseph J. Spryshak, Hartland; David J. Kramer, Rochester Hills, both of MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/706,163

(22) Filed: Nov. 3, 2000

(51) Int. Cl.[7] ................................................ F16K 31/06
(52) U.S. Cl. ........................ 137/1; 251/54; 251/129.15
(58) Field of Search ........................ 251/50, 54, 129.15, 251/129.01, 52, 48; 137/613, 1

(56) References Cited

U.S. PATENT DOCUMENTS

| | | | | |
|---|---|---|---|---|
| 3,108,777 A | * | 10/1963 | Ray ............................ 251/54 |
| 3,326,511 A | * | 6/1967 | Hallgreen .................... 251/54 |
| 3,633,869 A | * | 1/1972 | Lehmann ................... 251/54 X |
| 4,157,168 A | * | 6/1979 | Schlagmuller et al. ........ 251/52 |
| 5,722,633 A | * | 3/1998 | Goossens et al. ...... 251/129.15 |
| 5,984,259 A | * | 11/1999 | Najmolhoda et al. ......... 251/50 |

* cited by examiner

Primary Examiner—Kevin Lee
(74) Attorney, Agent, or Firm—Roger A. Johnston

(57) ABSTRACT

A solenoid operated valve has a moveable armature sealed within an armature guide with a fluid dashpot disposed therein for velocity dampening armature movement as the armature closes an air gap with a stationary pole piece.

12 Claims, 4 Drawing Sheets

DAMPENING OF SOLENOID OPERATED VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electric solenoid operated valves and particularly relates to the problem of the noise generated by such solenoids when subjected to operating environment of relatively high vibration such as is encountered in motor vehicle applications. Furthermore in certain solenoid operated valve applications where high pressures are encountered of the order of 350 psi (2415 kPa) a significant force is required on the moveable armature/valve member in order to effect opening of the valve against the pressure forces. The required force on the armature often results in high velocity of the armature during opening; and, impact of the armature against the stop or pole piece adjacent the armature generates a significant amount of noise upon closing of the working air gap.

Heretofore, attempts to reduce the velocity of the armature have been generally directed toward increasing the bias on the armature which in turn results in the requirement for greater force in moving the armature to open the valve. Where a limited amount of power is available for the solenoid, and particularly where increases in the number of ampere turns of the coil would result in prohibitive cost increase for valves produced in high volume mass production, increasing the bias force on the armature has not be an option. This is particularly the case in automotive applications where a solenoid operated valve is employed for controlling the flow of refrigerant between the condenser and the evaporator inlet for the vehicle passenger compartment air conditioning system. In such systems, it is common practice to mount the electrically operated expansion valve on the evaporator housing which is usually attached to the engine firewall. Thus, operating noise generated in the expansion valve is transmitted to the vehicle fire wall structure and has been found to resonate through the vehicle structure and provide objectionable levels of noise in the vehicle cabin.

Solenoid operated valves, when employed in systems subject to sudden pressure changes and changes in phase of fluid flowing through the valve, such as is the case for liquid/vapor refrigerant, are particularly susceptible to noise generated within the solenoid operator by virtue of the armature velocity resulting from the forces required to effect movement of the armature over a wide range of pressures and fluid conditions.

Thus, it has long been desired to provide a solenoid operated valve, particularly one which is suitable for valving liquid/vapor refrigerant in an air conditioning system for motor vehicle usage which is relatively low in manufacturing cost in high volume production and which eliminates the noise generated by rapid armature movement against a stop and which is easy to manufacture and robust in service.

BRIEF SUMMARY OF THE INVENTION

The present invention provides a solution to the above-described problem of finding a way or means of quieting an electrically energized solenoid operated valve in which noise generated by high armature velocities and impact of the armature against a limit stop is minimized or substantially eliminated. The valve of the present invention utilizes a solenoid for operating a pilot valve member for creating a pilot flow resulting in a reduced pressure differential which enables opening a main valve member and is particularly suitable for use as a shutoff valve for high pressure liquid/vapor refrigerant flow in a motor vehicle air conditioning system.

The valve of the present invention utilizes a fluid dashpot disposed internally of the solenoid coil and within a sealed armature guide and provides for viscous dampening of the armature movement when subjected to substantial magnetomotive force on the armature. The dashpot limits the armature velocity thereby controlling the impact of the armature with the pole piece upon closing of the working air gap. The dashpot of the present invention utilizes the fluid medium flowing through the valve as the operating fluid for the dashpot. In the presently preferred practice, the dashpot is connected to a pilot valve member. A minimum of force is required to overcome the return or closing spring provided for the pilot valve member. The solenoid operated valve of the present invention thus employs an internally disposed fluid dampening device in the form of a dashpot to limit the velocity of the armature upon energization of the solenoid and thereby minimizes the noise generated by the armature impacting a limit stop due to the magnetomotive force of the solenoid. The valve construction of the present invention is particularly suitable for pilot operated solenoid valves employed for controlling the shutoff of liquid/vapor fluids as encountered in refrigerant systems and particularly such systems as they are utilized in motor vehicle cabin air conditioning systems.

DETAILED DESCRIPTION OF THE INVENTION

Figure 1:
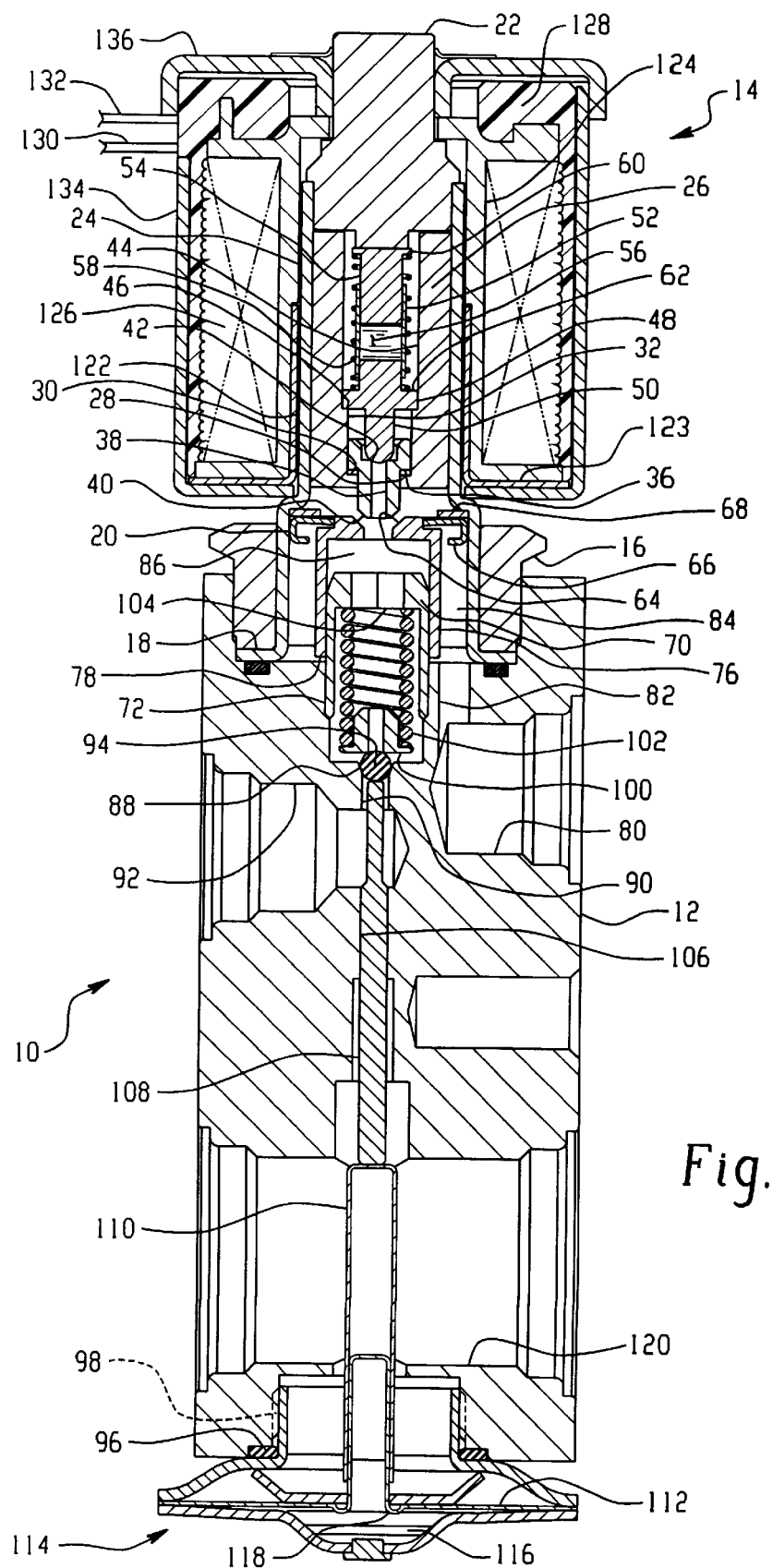
FIG. 1 is a cross-section taken through the longitudinal plane of symmetry of the valve of the present invention.

Referring to the drawing, the valve assembly is indicated generally at 10 and includes a valve body 12 and solenoid actuator indicated generally at 14 attached to the valve body by a collar 16 threadedly engaging the end of the valve body 12 and bearing against a flange 18 formed on an open end of a tubular armature guide 20 provided for the armature.

The armature guide 20 extends upwardly and outwardly of the valve body and has its upper end closed by a flux collector or pole piece 22 secured over the end of the guide 20 in fluid sealing arrangement; as, for example, by crimping or staking or press fit. Armature guide 20 has a reduced diameter upper portion 24 which has slidably disposed therein an annular armature member 26 formed of magnetically permeable material and which has a reduced diameter guide bore 28 formed in the lower end thereof which forms a shoulder 30 with a larger diameter bore 32 of the armature. Bore 28 has slidably received therein a reduced diameter portion of a main member 34.

The valve member 34 is sized to slidably fit in bore 32 and has a shoulder 36 formed thereon which is adapted to be contacted by the shoulder 30 formed in the armature upon upward movement of the armature. Valve member 34 has a pilot passage 38 formed therethrough and a valving surface 40 formed on the lower end thereof with a pilot valve seat 42 formed at the upper end of passage 38.

The armature has a counter bore 44 formed in the upper end thereof which forms a shoulder 46 with the bore 32. A plunger 48 is slidably received in bore 44 with a pilot valve member 50 preferably formed integrally therewith and extending downwardly therefrom with the lower end thereof configured to contact the pilot valve seat 42 in a sealing engagement.

Plunger 48 has a tubular member 52 attached thereto preferably by press fit engagement which extends upwardly and has slidably received therein a dashpot piston 54 which is closely fitted with the inner periphery of tube 52 so as to permit controlled metered passage of the valved fluid therethrough from the chamber 56 formed between piston 54 and the plunger 48 within the tube 52. Alternatively the tube 52 may be attached to member 54 and a member 48 formed as a sliding piston.

A coil spring 58 is received over tube 52 and has its upper end registered against a flange 60 formed on the upper end of piston 54. The lower end of spring 58 is registered against an annular shoulder or flange 62 provided on the plunger 48. Spring 58 urges the piston in a direction away from plunger 48 so as to enlarge the dashpot chamber 56 causing the upper end of the piston 54 to register against the under surface of pole piece 22; and, the undersurface of flange 62 is registered against the shoulder 46 of the armature.

A main valve seat member 64 is disposed within the armature guide tube 20 and is positioned to be contacted by the lower end of valve member 34. Seat member 64 is retained in position by a suitable clip 66 and sealed therein by a gasket 68. Clip 66 is of a spider-like configuration to permit fluid passage therethrough. Valve seat member 64 is received over an adjustment plug 70 which has the lower end thereof adjustably engaged in the block 12 by threads 72 and is rotatable therein for adjustment as will be hereinafter described.

Valve seat member 64 has an annular portion 76 extending downwardly therefrom and which is sealed against the surface of the block 12 by a suitable gasket 78 provided on the lower end thereof.

Valve block 12 has a high pressure inlet port 80 formed therein which is adapted to receive the liquid to be valved, such as liquid refrigerant; and, port 80 communicates with a riser passage 82 which communicates with the annular chamber 84 formed about the inner periphery of the armature guide 20 and the lower portion 76 of the valve seat member. The clip 66 is formed as having a generally spider-like configuration and is thus open to passage of the liquid refrigerant therethrough to the interior of the upper portion 24 of the armature guide occupied by the armature.

The chamber formed below valve seat 66, denoted by reference numeral 86, within the annular portion 76 of the valve seat, communicates with an expansion valve seat 88 formed in the block 12 which communicates with an outlet passage 90 which communicates with outlet port 92 which adapted for connection to a portion of a system operating at reduced pressure as, for example, the evaporator inlet in a refrigeration or air conditioning system.

A ball valve member 94 is received on valve seat 88 and is biased thereagainst by a collar 100 which is urged downwardly and against the upper surface of the ball valve 88 by a spring 102 having its upper end registered against a shoulder 104 formed in plug 70 and the lower end of the spring registered against collar 100.

It will be understood that the bias force of the spring 102 against the collar 100 and the ball valve 88 is adjustable by rotating the plug 70 in threads 72 in the block 12.

Block 12 has a bore 106 formed downwardly therein into which is slidably received in closely fitting arrangement so as to minimize fluid leakage, an operating rod 108 which has its lower end contacting the end of an actuator tube 110. Tube 110 is connected to a pressure responsive diaphragm 112 disposed in a capsule indicated generally at 114 and which is filled with a suitable temperature responsive fluid in chamber 116, which fluid communicates through aperture 118 with the interior of tube 110. The tube 110 is disposed in a cross flow port 120 which passes through the block 12 and has flowing therethrough the fluid to be sensed, such as refrigerant returning from the evaporator to the pump return in refrigeration or air conditioning applications of the present valve. As the temperature of the fluid changes in passage 120, the fluid in tube 110 and in chamber 116 expands or contracts thereby creating pressure changes in the chamber 116 and causing the diaphragm 112 to move the tube 110 for moving operating rod 108 to move the ball valve 94 opening valve seat 88 by moving ball valve member 94 upwardly causing collar 100 to compress spring 104.

It will be understood that capsule 114 is sealed in the block by O-ring 96 and retained therein by suitable threaded engagement as denoted by reference numeral 98.

The armature guide upper portion 24 has received thereover an annular flux collector member 122 having an outwardly extending annular flange 123 and a bobbin 124 upon which is wound a solenoid coil 126 as indicated by dashed lines in FIG. 1. Coil 126 is encapsulated by a suitable insulating material as denoted by reference numeral 128 and from which the coil electrical leads 130, 132 extend. An outer pole frame or casing 130 surrounds the encapsulated coil; and, the pole piece 22 is retained in place by an end cap 136 which completes the flux loop between the pole piece 22 and the casing 134.

Figure 2:
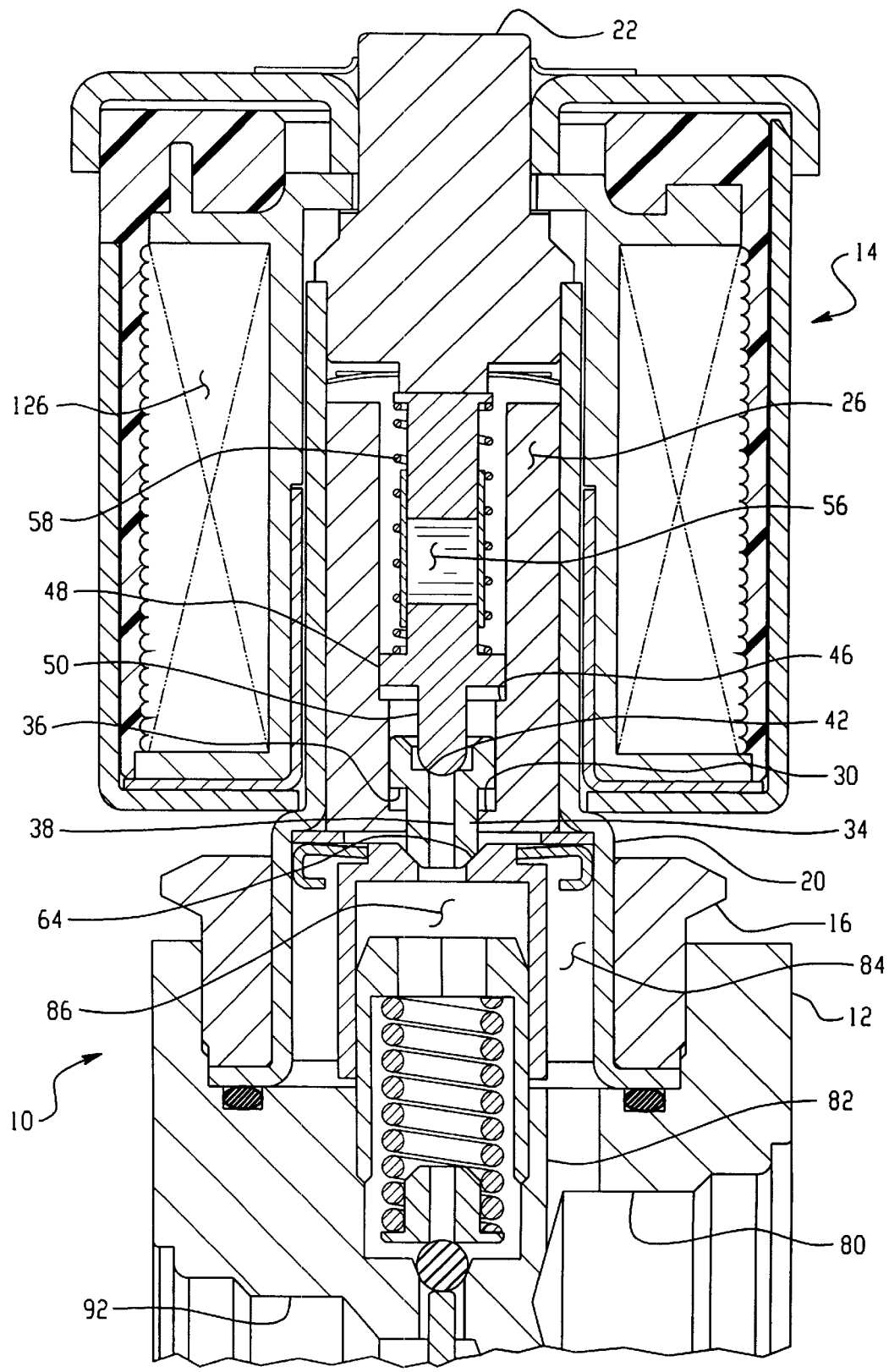
FIG. 2 is an enlarged view of a portion of FIG. 1 showing the valve in the de-energized state.

Referring to FIG. 2, the valve is shown with the coil 126 in the de-energized and closed condition wherein the spring 58 has biased the pilot valve portion 50 of plunger 48 downwardly against the pilot valve seat 42 thereby closing pilot passage 38 preventing communication of the pressurized fluid in chamber 84 within the armature guide 20 from discharging into the outlet chamber 86. The force of the pilot valve 50 acting against pilot valve seat 42 causes the main valve member 34 to be seated against the main valve seat 64 preventing fluid from the chamber 84 from flowing over the valve seat 64.

It will be observed from FIG. 2 that with the pilot valve member 50 closed against seat 42, and main valve 34 closed against seat 64, the shoulder 36 on the main valve is spaced from the shoulder 30 in the armature; and, the undersurface of plunger 48 is spaced from the shoulder 46 formed by the counter bore in the armature. Thus, in the de-energized state the armature is free for limited movement in the vertical direction by the amount of spacing of the shoulders 46, 30.

Figure 3:
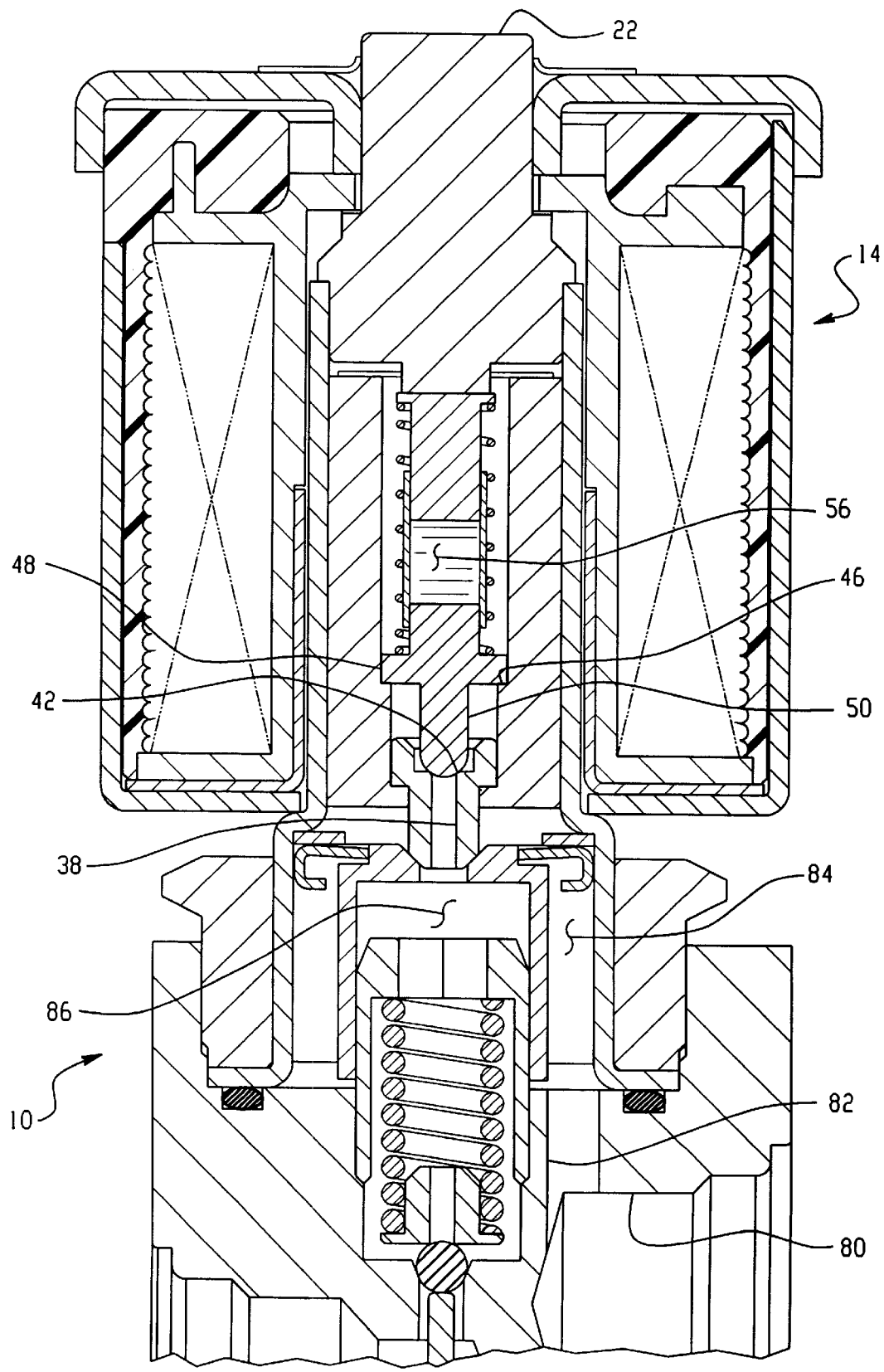
FIG. 3 is a view similar to FIG. 2 showing the valve energized with the pilot valve open; and, FIG. 4 is a view similar to FIG. 2 showing the valve energized and fully open.

Referring to FIG. 3, the valve is shown in the condition with the coil energized sufficiently to raise the armature to cause shoulder 46 to engage the underside of pilot valve 48 and lift the pilot valve 50 from pilot seat 42 allowing fluid flow through pilot passage 38 to chamber 86 but with the main valve 34 remaining seated or closed on seat 64.

Figure 4:
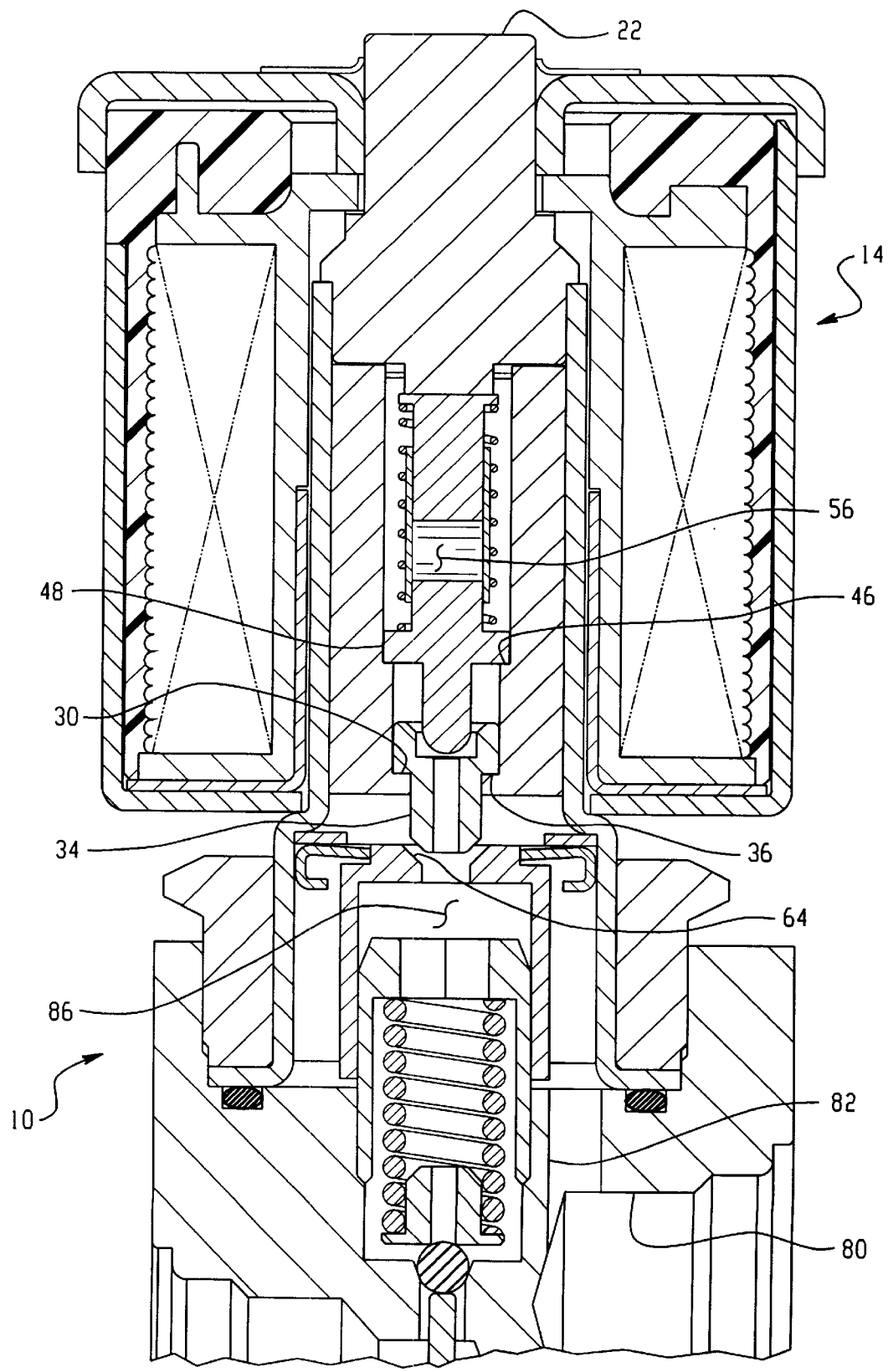

Referring to FIG. 4, the valve is shown with the armature raised to the limit of its travel and contacting and latched against pole piece 22, whereupon the shoulder 30 of the armature has contacted the shoulder 36 on the valve member 34 and has lifted the valve member 34 from the main valve seat 64, thereby permitting full flow from inlet 80 and riser passage 82 and over the valve seat 64 to outlet chamber 86.

The present invention thus provides a pilot operated solenoid actuated valve which has a fluid dashpot disposed within the armature guide for utilizing the fluid to be valved for dampening the movement of the armature during energization.

Although the invention has hereinabove been described with respect to the illustrated embodiments, it will be understood that the invention is capable of modification and variation and is limited only by the following claims.

What is claimed is:

1. A solenoid operated valve assembly comprising:
   (a) a coil including a stationary magnetically permeable pole piece and an armature guide associated with said pole piece;
   (b) a magnetically permeable armature disposed in said guide and moveable between a position opening and a position closing a working air gap with said pole piece;
   (c) a valve obturator carried by said armature and moveable therewith;
   (d) a dashpot disposed for dampening movement of said armature and valve member; and,
   (e) a valve body including a valving passage closed by said obturator, wherein said dashpot includes a tubular member associated with said obturator, and a piston slidably received in said tubular member wherein said piston is contacted by said pole piece.

2. The valve assembly defined in claim 1, wherein said armature has an annular configuration with the dashpot disposed therewithin.

3. A solenoid operated valve assembly comprising:
   (a) a coil including a stationary magnetically permeable pole piece and an armature guide associated with said pole piece;
   (b) a magnetically permeable armature disposed in said guide and moveable between a position opening and a position closing a working air gap with said pole piece;
   (c) a valve obturator carried by said armature and moveable therewith;
   (d) a dashpot disposed for dampening movement of said armature and valve member; and,
   (e) a valve body including a valving passage closed by said obturator, wherein said dashpot includes a first member registered against said armature and a piston slidably received in said first member.

4. A method of dampening armature movement in a solenoid operated valve comprising:
   (a) providing a valve body with an inlet and outlet;
   (b) disposing a magnetically permeable armature in a guide for movement therein and disposing a magnetically permeable stationary pole piece in association with said guide and forming working air gap with said armature;
   (c) disposing a fluid dashpot between said pole piece and said armature and disposing a valve obturator between said inlet and outlet;
   (d) disposing a coil proximate said guide and energizing said coil and moving said armature in a direction to close said air gap;
   (e) dampening armature movement with restricted fluid flow in said dashpot; and,
   (f) disposing a thermally responsive valve in said body in the flow path downstream of said obturator.

5. The method defined in claim 4, wherein said step of disposing a dashpot includes forming a cavity in said armature and disposing said dashpot in said cavity.

6. The method defined in claim 4, wherein said step of moving a valve obturator includes moving an obturator with respect to a valve seat.

7. The method defined in claim 4, further comprising disposing a thermally responsive valve in said body in the fluid flow path downstream of said obturator.

8. The method defined in claim 4, wherein said step of moving said armature includes lifting said obturator from a closed position on valve seat.

9. The method defined in claim 4, wherein said step of disposing a dashpot includes forming a tube and closely fitting a piston in said tube and moving said piston in said tube.

10. The method defined in claim 4, wherein said step of moving a valve obturator includes biasing said obturator in contact with a valve seat.

11. The method defined in claim 4, wherein said step of moving a valve obturator includes moving a pilot valve member and thereupon effecting opening of a main valve member.

12. The method defined in claim 4, wherein said step of disposing a dashpot includes press fitting a tubular member to said obturator.

* * * * *